(12) United States Patent
Reid

(10) Patent No.: US 11,078,098 B2
(45) Date of Patent: *Aug. 3, 2021

(54) FLOW EQUALIZATION REACTOR HAVING MULTIPLE WASTEWATER TREATMENT ZONES

(71) Applicant: John H. Reid, Fredericksburg, VA (US)

(72) Inventor: John H. Reid, Fredericksburg, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/203,277

(22) Filed: Nov. 28, 2018

(65) Prior Publication Data

US 2019/0092665 A1 Mar. 28, 2019

Related U.S. Application Data

(63) Continuation-in-part of application No. 15/203,359, filed on Jul. 6, 2016, now Pat. No. 10,155,682.

(51) Int. Cl.
*C02F 3/30* (2006.01)
*C02F 3/00* (2006.01)
(Continued)

(52) U.S. Cl.
CPC ............. *C02F 3/302* (2013.01); *C02F 3/006* (2013.01); *C02F 3/301* (2013.01); *C02F 3/307* (2013.01); *C02F 3/308* (2013.01); *C02F 2101/105* (2013.01); *C02F 2101/16* (2013.01); *C02F 2209/40* (2013.01)

(58) Field of Classification Search
CPC .......... C02F 3/302; C02F 3/307; C02F 3/006; C02F 3/301; C02F 3/308; C02F 2101/105; C02F 2101/16; C02F 2209/40

USPC ....... 210/603, 605, 607, 621, 622, 623, 630, 210/903, 906
See application file for complete search history.

(56) References Cited

U.S. PATENT DOCUMENTS 5,156,742 A   10/1992  Struewing
6,004,456 A   12/1999  Khudenko
(Continued)

OTHER PUBLICATIONS

European Search Report of the European Patent Office dated Oct. 20, 2017 in the corresponding European patent application 17179896.0-1371.

*Primary Examiner* — Fred Prince
(74) *Attorney, Agent, or Firm* — Walter Ottesen, P.A.

(57) ABSTRACT

A method of treating wastewater is disclosed in which a flow equalization reactor is provided that includes at least one wastewater treatment zone. A first wastewater treatment process is performed in the at least one wastewater treatment zone, which can be switched to a second wastewater treatment process. The flow equalization reactor is designed with a variable liquid depth and volume that can operated as a mixed wastewater zone, an anaerobic reactor zone, an anoxic reactor zone or an aerobic reactor zone. The equalization reactor provides sufficient variable liquid depth and volume above a minimum liquid depth and residual volume to provide the necessary hydraulic flow equalization or surge volume to achieve a relatively constant effluent pumping rate or feed forward flow rate over 24 hours per day, seven days per week into the downstream biological treatment processes, clarifiers, filters, or disinfection units, etc.

22 Claims, 6 Drawing Sheets

(51) Int. Cl.
*C02F 101/16* (2006.01)
*C02F 101/10* (2006.01)

(56) References Cited

U.S. PATENT DOCUMENTS

| | | |
|---|---|---|
| 6,312,599 B1 | 11/2001 | Reid |
| 7,329,351 B2 * | 2/2008 | Roberts ............... B01F 3/04609 |
| | | 210/150 |
| 8,808,543 B2 | 8/2014 | Reid |
| 9,005,442 B2 | 4/2015 | Reid |
| 10,155,682 B2 * | 12/2018 | Reid ....................... C02F 3/302 |
| 2009/0255870 A1 * | 10/2009 | Weissman .......... G01N 33/1826 |
| | | 210/605 |
| 2011/0168611 A1 | 7/2011 | Early et al. |
| 2013/0001159 A1 | 1/2013 | Reid |
| 2013/0256221 A1 | 10/2013 | Reid |
| 2016/0075577 A1 | 3/2016 | Reid |

\* cited by examiner ers are used to designate like elements.

FLOW EQUALIZATION REACTOR HAVING MULTIPLE WASTEWATER TREATMENT ZONES

CROSS REFERENCE TO RELATED APPLICATION

This application is a continuation-in-part application and claims priority from U.S. patent application Ser. No. 15/203,359, filed Jul. 6, 2016, the entire content of which is incorporated herein by reference.

FIELD OF THE DISCLOSURE

A wastewater treatment system including a flow equalization reactor is disclosed, in which at least one wastewater treatment zone is provided within the variable liquid depth and volume flow equalization reactor. The flow equalization reactor provides sufficient variable liquid depth and volume above a minimum liquid depth and residual volume to provide the necessary hydraulic flow equalization or surge volume to achieve a relatively constant effluent pumping rate or feed forward flow rate over 24 hours per day, seven days per week into the downstream biological treatment processes, clarifiers, filters, or disinfection units, etc.

BACKGROUND

In a typical wastewater treatment facility, a population of bacteria is grown and maintained to biologically remove organic pollutants, such as nitrogen or phosphorous, and to reduce the biochemical oxygen demand (BOD) of the wastewater. The bacteria are maintained in reactors holding the wastewater to be treated. Depending on the nature of the bacteria and the desired biological removal that these bacteria perform, the reactors are operated under, for example, aerobic, anoxic, or anaerobic conditions.

Different reactors operating under different conditions may be combined to provide a sequential treatment with successive removal of pollutants. For example, it is possible to combine in series an anaerobic reactor, an anoxic reactor, and an aerobic reactor followed by a final clarifier. Additionally, aerobic mixed liquor can be recycled to the anoxic reactor and return activated sludge can be recycled to the anaerobic reactor.

Further, it is known from U.S. Pat. No. 9,005,442 to equalize a wastewater inflow into a flow equalization reactor to minimize the variations of the wastewater inflow rate into the wastewater treatment facility. Nonetheless, it is desirable to further improve the effectiveness of the treatment process under varying conditions, such as changes in composition of the wastewater and/or of the wastewater inflow rate.

SUMMARY OF THE DISCLOSURE

Disclosed herein is a method of treating wastewater in a flow equalization reactor (EQ reactor) with variable liquid depth and volume that can be designed and operated with or without internal partitions to segregate the EQ reactor into a plurality of wastewater treatment zones.

In particular, a method of treating wastewater is disclosed which includes providing a flow equalization reactor having at least one wastewater treatment zone; receiving an inflow of wastewater into the flow equalization reactor; performing a first wastewater treatment process in the at least one wastewater treatment zone; conducting an outflow from the at least one wastewater treatment zone to a downstream wastewater treatment stage; and, switching from the first wastewater treatment process to a second wastewater treatment process in the at least one wastewater treatment zone; wherein at least one of the first wastewater treatment process and the second wastewater treatment process is a biological wastewater treatment process.

Moreover, a method of treating wastewater in a dual train or multi-train wastewater treatment system is disclosed which includes providing at least two flow equalization reactors upstream of a dual train or multi-train wastewater treatment system; and, operating the at least two flow equalization reactors in series.

BRIEF DESCRIPTION OF THE DRAWINGS

The disclosure will now be described with reference to the drawings wherein.

DESCRIPTION OF THE BEST AND VARIOUS EMBODIMENTS

Figure 1:
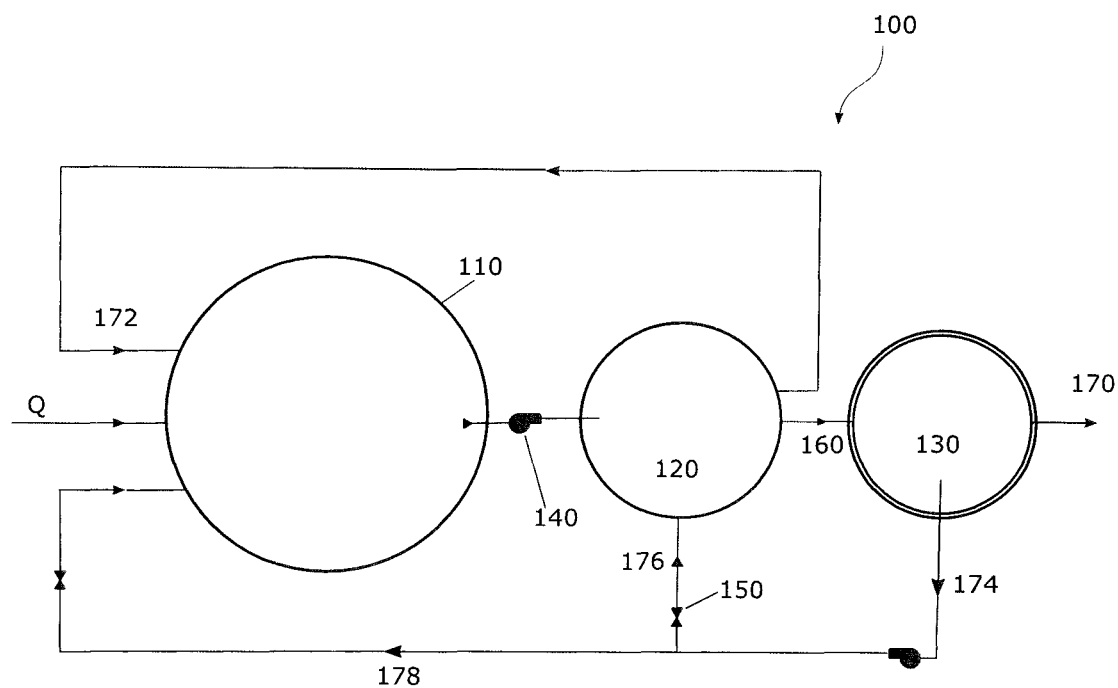
FIG. 1 shows a wastewater treatment system 100 including an equalization reactor 110 that is operated as an anoxic denitrification reactor.

The foregoing and other objects, aspects, and advantages of the disclosure will be better understood from the following detailed description of the best and various embodiments. Throughout the various views and illustrative embodiments of the present disclosure, like reference numbers are used to designate like elements.

In a typical embodiment, the biological wastewater treatment process is selected from the group consisting of carbonaceous biological oxygen demand (BOD) removal, luxury biological phosphorous uptake, nitrite removal, nitrate removal, nitrite and nitrate removal, and ammonium nitrogen removal.

In another typical embodiment, the first wastewater treatment process and the second wastewater treatment process are biological wastewater treatment processes.

In yet another typical embodiment, the first wastewater treatment process or the second wastewater treatment process is not a biological wastewater treatment process and is selected from the group consisting of a variable volume wastewater storage, wastewater mixing, and aeration, or a combination thereof.

In a particular embodiment, the inflow Q of wastewater is screened raw wastewater, screened stormwater, a mixture of screened raw wastewater and screened stormwater, a primary clarifier effluent, a dissolved air flotation (DAF) pretreatment system effluent, an anaerobic lagoon effluent, or an anaerobic reactor effluent.

In another particular embodiment, the outflow from the at least one wastewater treatment zone has a substantially constant pumping rate or feed forward flow rate.

In yet another particular embodiment, at least one partition wall or curtain is provided in the flow equalization reactor to define two or more wastewater treatment zones, wherein the at least one partition wall or curtain has an opening at or near the bottom so that the two or more wastewater zones in the flow equalization reactor operate at a substantially similar variable liquid level.

Typically, the downstream wastewater treatment stage is selected from the group consisting of a downstream nitrification stage, a downstream nitritation stage, an anammox reactor stage, and a final clarifier stage.

Also typically, a nitrate or nitrite mixed liquor recycle flow line is provided for recycling a partially treated effluent from a downstream wastewater treatment stage to an upstream wastewater treatment stage. Moreover, a nitrate or nitrite mixed liquor recycle flow through the recycle line is typically of from 100% to 400% of the inflow Q into the flow equalization reactor.

With particularity, a return activated sludge line is provided for recycling activated sludge from a downstream wastewater treatment stage to an upstream wastewater treatment stage. Also with particularity, a return activated sludge flow through the return activated sludge line is of from 50% to 200% of the inflow of wastewater into the flow equalization reactor.

In a typical embodiment, an anoxic mixed liquor recycle flow of from 50% to 200% of the inflow Q is provided from a downstream wastewater treatment zone to an upstream wastewater treatment zone. In another typical embodiment, the method further includes providing a nitrite mixed liquor recycle flow from a nitritation reactor into the first wastewater treatment zone of the flow equalization reactor; obtaining a total outflow out of the flow equalization reactor, the total outflow having a volume corresponding to a total volume of the inflow Q and the nitrite recycle flow; conducting about 55% of the total inflow from the flow equalization reactor into a nitritation reactor as a flow Q1; receiving about 45% of the total inflow from the flow equalization reactor as a flow Q2; and, mixing the flow Q1 and the flow Q2.

In another typical embodiment, the method further includes receiving the mixture of the flow Q1 and the flow Q2 in an anammox reactor. In yet another typical embodiment, an outflow from the anammox reactor is received in a final clarifier.

In a particular embodiment, the method further includes providing a first return activated sludge flow from the final clarifier into the nitritation reactor; and, providing a second return activated sludge flow from the final clarifier into the anammox reactor. In another particular embodiment, the first return activated sludge flow is of from 0% to 20% of the inflow of wastewater into the flow equalization reactor, and the second return activated sludge flow is of from 80% to 200% of the inflow of wastewater into the flow equalization reactor. Both return activated sludge flows can exist continuously at the same time or can be independently cycled on and off.

With particularity, the method further includes operating a first flow equalization reactor as a first stage anaerobic reactor as part of an enhanced biological phosphorous removal process; conducting an outflow from the first flow equalization reactor to a second flow equalization reactor; operating the second flow equalization reactor as an anoxic denitrification reactor for biological nitrite and nitrate nitrogen removal; and, operating a third flow equalization reactor as an aerobic nitrification reactor for biological ammonia nitrogen removal.

Turning to the drawings, FIG. 1 shows a wastewater treatment system 100 including an equalization reactor 110 that is operated without any partitions, thereby allowing the entire inner space of the reactor 110 to be used for equalizing the wastewater inflow Q as well as for performing a first biological treatment process. In this case, the equalization reactor is operated as an anoxic denitrification reactor in which denitrifying bacteria convert some of the nitrate to nitrogen gas under very low concentrations of, or in the absence of, dissolved oxygen (DO). Pump 140 pumps an effluent from the EQ reactor to a constant volume nitrification reactor 120 for converting ammonium nitrogen into nitrite nitrogen and nitrate nitrogen. Nitrate recycle (NR) line 172 is provided to return nitrate produced in the nitrification reactor to the EQ reactor. Typically, the nitrate recycle flow is of from 200% to 400% of the total daily inflow Q into the wastewater treatment system. From the nitrification reactor 120, treated effluent is conducted to final clarifier 130 through line 160. Sludge is allowed to settle in the final clarifier 130 while treated water is discharged to the receiving stream via line 170.

Activated sludge is returned from the final clarifier through return activated sludge (RAS) line 174, which may be returned to the nitrification reactor 120 via line 176 and/or to the EQ reactor via line 178. Valve 150 is provided to turn on and off or to adjust the RAS flow.

Figure 2:
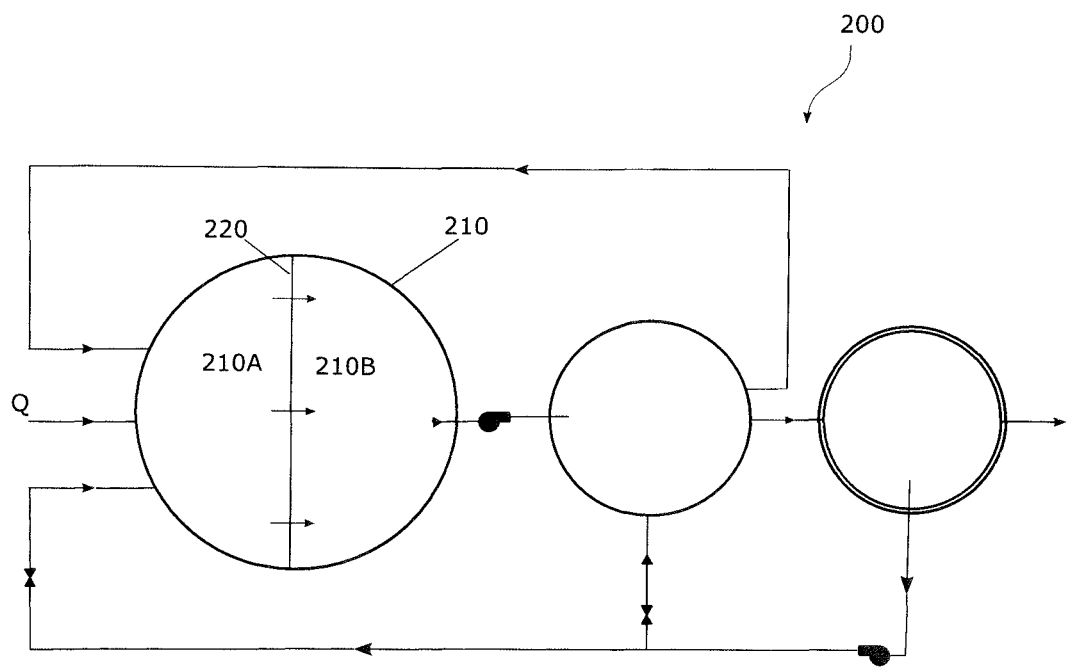
FIG. 2 shows a wastewater treatment system 200 including an equalization reactor 210 that is divided into two wastewater treatment zones by partition wall 220.

FIG. 2 shows a wastewater treatment system 200 including an equalization reactor 210 that is divided into two wastewater treatment zones by partition wall 220. The inflow Q is first received in wastewater treatment zone 210A where anoxic denitrification takes place. Through flow holes 1110 provided at or near the bottom of the partition wall, partially treated wastewater flows into the second treatment zone 210B, which is operated as either an anoxic denitrification section or as an aerobic nitrification section. Equalization reactor 210 equalizes the inflow into the downstream treatment stages by receiving a varying inflow Q and providing a substantially constant outflow, which is pumped into the downstream nitrification reactor. Moreover, the liquid level within the first and the second wastewater treatment zones 210A and 210B is substantially the same, even though the total liquid level within the EQ reactor varies with varying inflow Q.

Figure 3:
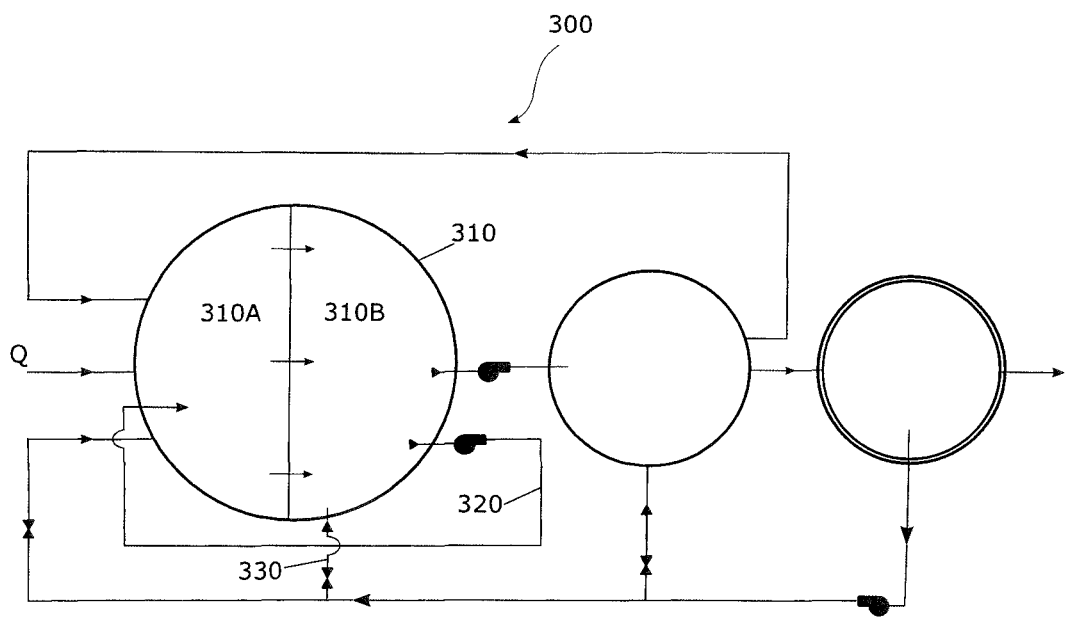
FIG. 3 shows a wastewater treatment system 300 in which an anoxic mixed liquor recycle flow is conducted from the anoxic denitrification treatment zone 310B to the anaerobic biological phosphorous treatment zone 310A.

FIG. 3 shows a wastewater treatment system 300 in which an equalization reactor 310 is divided into treatment zones 310A and 310B. An anoxic recycle (AR) flow is conducted from the anoxic denitrification treatment zone 310B through line 320 to the anaerobic biological phosphorous removal treatment zone 310A. An effluent from treatment zone 310B is pumped to a nitrification reactor. There exists one or more nitrate recycle lines (top and bottom lines in FIG. 3, not numbered) recycling flow from the nitrification reactor to the denitrification treatment zone 310A and/or optionally to denitrification treatment zone 310B (via line 330). Subsequently, the effluent from the nitrification reactor is conducted to a final clarifier. Further, a RAS line recycles activated sludge from the final clarifier to one or more of the treatment zone 310A, treatment zone 310B, and the nitrification reactor.

Figure 4:
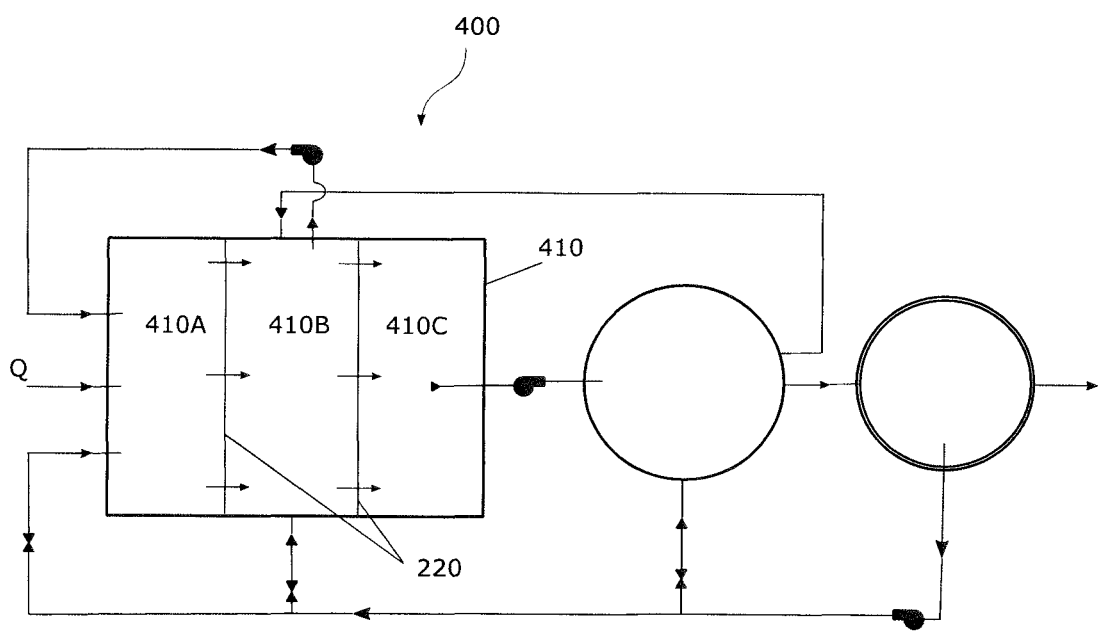
FIG. 4 shows a wastewater treatment system 400 in which equalization reactor 410 is divided into three wastewater treatment zones by two partition walls 220.

FIG. 4 shows a wastewater treatment system 400 in which two partition walls 220 divide equalization reactor 410 into three wastewater treatment zones. Inflow Q flows into the first treatment zone 410A, which is operated as an anaerobic biological phosphorous treatment zone. Partially treated wastewater flows into the second wastewater treatment zone 410B, which is operated as an anoxic denitrification treatment zone. There exists one or more nitrate recycle lines (lines in FIG. 4 above and below the nitrification reactor, not numbered) recycling flow from the nitrification reactor to the denitrification treatment zone 410A and/or optionally to denitrification treatment zone 410B. Subsequently, wastewater flows into the third treatment zone 410C, which is operated as an aerobic nitrification zone.

The liquid levels within each of the three wastewater treatment zones 410A through 410C are substantially similar, even though the total liquid level varies in all three treatment zones with varying inflow Q.

Figure 5:
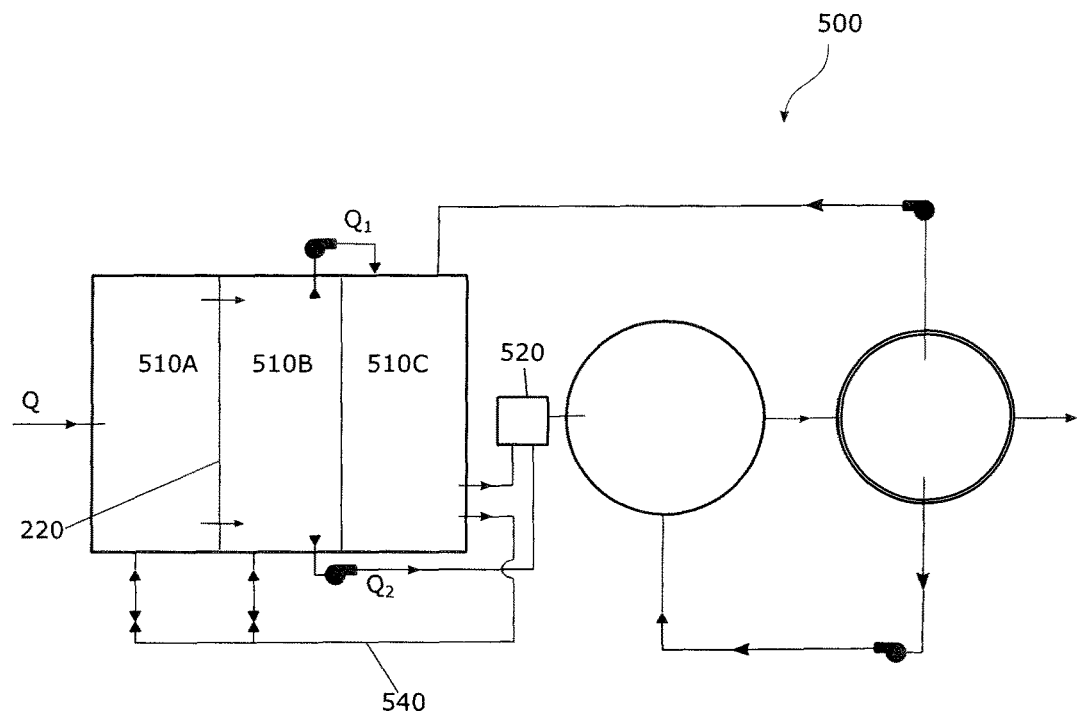
FIG. 5 shows a wastewater treatment system 500 in which about 55% of the outflow from anoxic denitrification treatment zone 510B is pumped to constant volume nitritation reactor 510C and about 45% of the outflow from anoxic denitrification treatment zone 510B is pumped to mixing cell 520.

FIG. 5 shows a wastewater treatment system 500 in which a partition wall 220 separates the first treatment zone 510A from the second treatment zone 510B. The liquid levels in zones 510A and 510B are substantially similar. The partition of the third treatment zone 510C, however, does not include flow holes. Thus, the third reactor zone is operated as a constant volume reactor. In particular, zone 510C is operated as a nitritation reactor.

The nitrite recycle line 540 returns a nitrite mixed liquor recycle flow (NITR) from nitritation reactor 510C to the first wastewater treatment zone 510A, which is operated as an anaerobic biological phosphorous treatment zone, and/or to the second wastewater treatment zone 510B, which is operated as an anoxic denitrification treatment zone. The nitrite mixed liquor recycle flow is from 200% to 400% of the inflow Q. Thus, the total outflow out of the second wastewater treatment zone 510B is the sum of the inflow Q and the nitrite recycle flow NITR.

The total outflow out of the second treatment zone 510B is bifurcated, and about 55% of the outflow from anoxic denitrification treatment zone 510B, i.e., $Q_1$, is pumped to the constant volume nitritation reactor 510C and about 45% of the outflow from anoxic denitrification treatment zone 510B, i.e., $Q_2$, is pumped to mixing tank 520. Accordingly, the flow $Q_1$ is 0.55·(Q+NITR) and $Q_2$ is 0.45 (Q+NITR).

The combined liquors from the mixing cell flow into the constant volume reactor 530, which is operated as an anammox reactor. Specifically, anammox reactor 530 contains bacteria mediating the direct conversion of nitrite and ammonium into nitrogen gas by the anaerobic ammonium oxidation (anammox) process that is used for deammonification of wastewater without the intermediate production of nitrate. The dissolved oxygen (DO) concentrations in the anammox reactor are kept between 0 mg/L and 0.2 mg/L.

From the reactor 530 an effluent is conducted to a final clarifier. Further, activated sludge may be recycled to nitritation reactor 510C with a flow of 0% to 20% Q and/or to the anammox reactor 530 with a flow of 80% to 200% Q.

Figure 6:
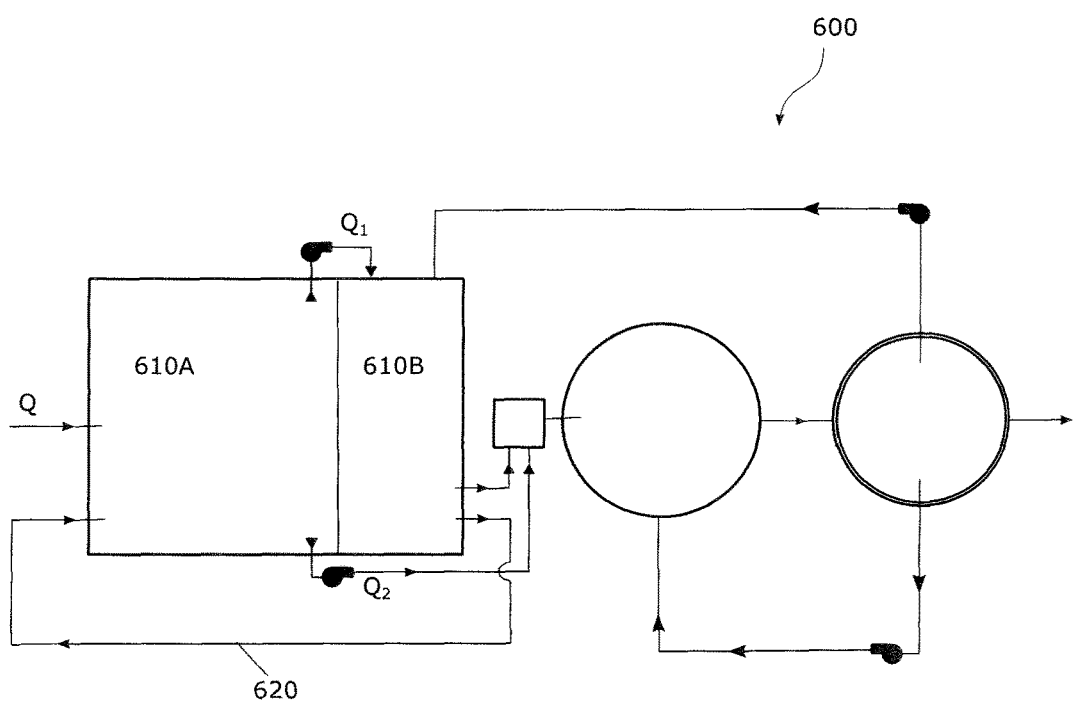
FIG. 6 shows a wastewater treatment system 600 including an equalization reactor 610A operated as an anoxic denitrification treatment reactor followed by a downstream constant liquid level and volume nitritation reactor 610B.

FIG. 6 shows a wastewater treatment system 600 including an equalization reactor 610A operated as an anoxic denitrification treatment zone and constant volume nitritation reactor 610B. Nitrite recycle line 620 returns an NITR flow to the anoxic denitrification treatment zone 610A. An outflow $Q_1$ of 0.55·(Q+NITR) is pumped into the constant volume nitritation reactor 610B and an outflow $Q_2$ with 0.45 (Q+NITR) is pumped into a mixing cell. The combined and mixed effluents from the mixing cell flow into an anammox reactor. After deammonification in the anammox reactor, the effluent is conducted into a final clarifier.

Figure 7:
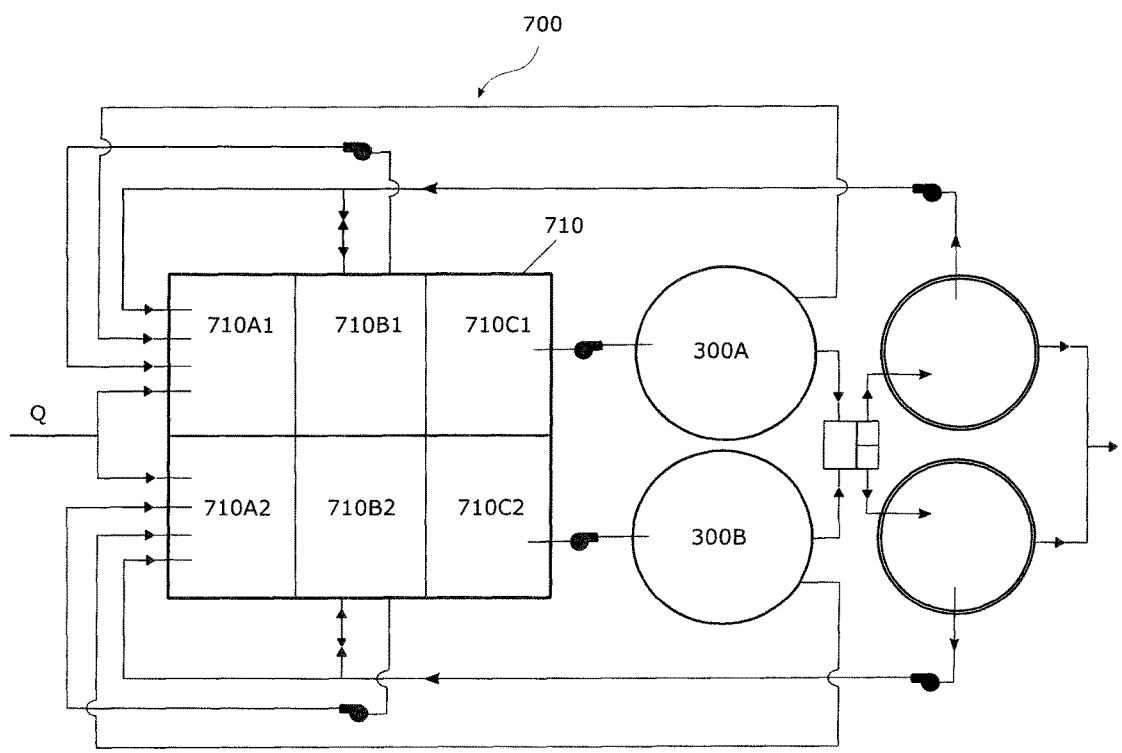
FIG. 7 shows a dual train wastewater treatment system 700 containing equalization reactor 710 provided upstream of anammox reactors 300A and 300B.

FIG. 7 shows a dual train wastewater treatment system 700 containing equalization reactor 710 provided upstream of nitrification reactors 300A and 300B. In a typical municipal wastewater treatment system, the biological treatment process has at least two process trains to provide system redundancy and reliability. In the depicted dual train system 700, two EQ reactors are provided within the basin of EQ reactor 710. Flow holes are provided in the partition walls or curtains between treatment zones 710A1 and 710B1 on the one hand, and between treatment zones 710A2 and 710B2 on the other hand. However, the partition wall between zones 710A1 and 710A2 and between zones 710B1 and 710B2 does not have flow holes. Similarly, wastewater can flow through flow holes from zones 710B1 and 710B2 into zones 710C1 and 710C2, respectively, but no flow is provided between zones 710C1 and 710C2.

Figure 8:
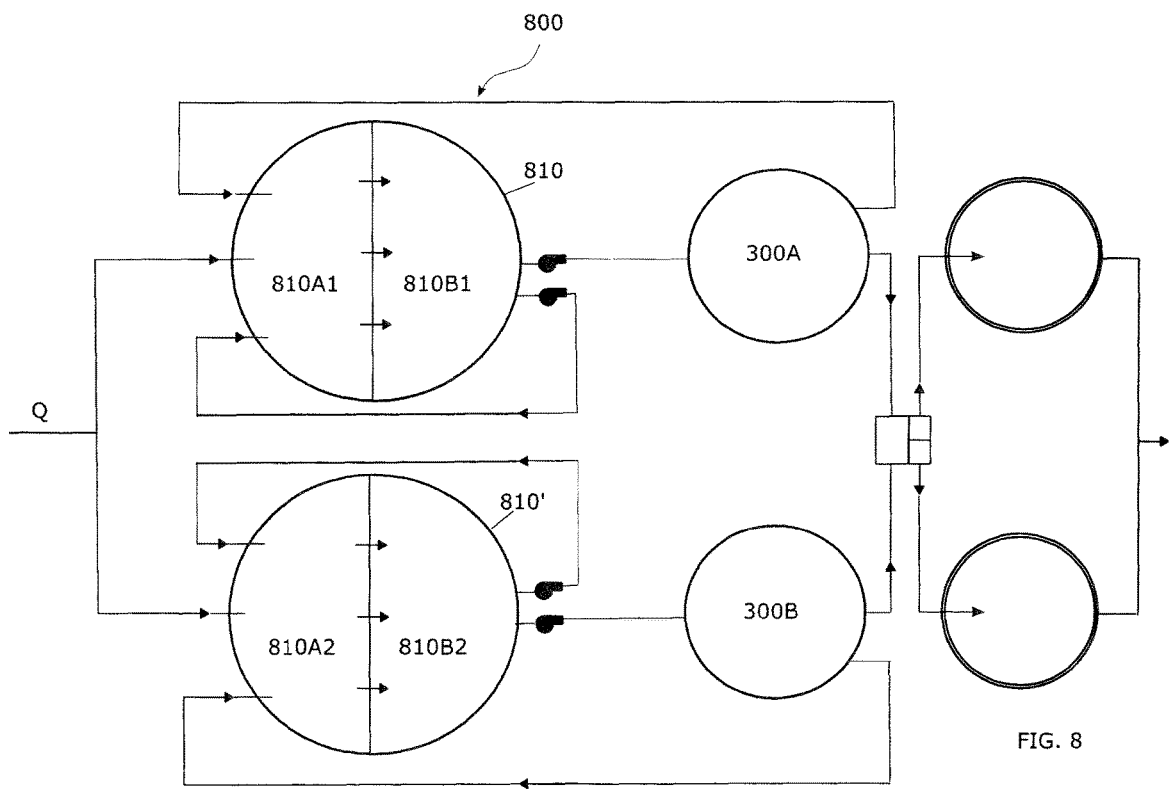
FIG. 8 shows a dual train wastewater treatment system 800 including two flow equalization reactors 810 and 810', which are each divided into two wastewater treatment zones.

FIG. 8 shows a dual train wastewater treatment system 800 including two flow equalization reactors 810 and 810', which are each divided into two wastewater treatment zones. Specifically, EQ reactor 810 is divided into treatment zones 810A1 and 810B1 and EQ reactor 810' is divided into treatment zones 810A2 and 810B2.

Figure 9:
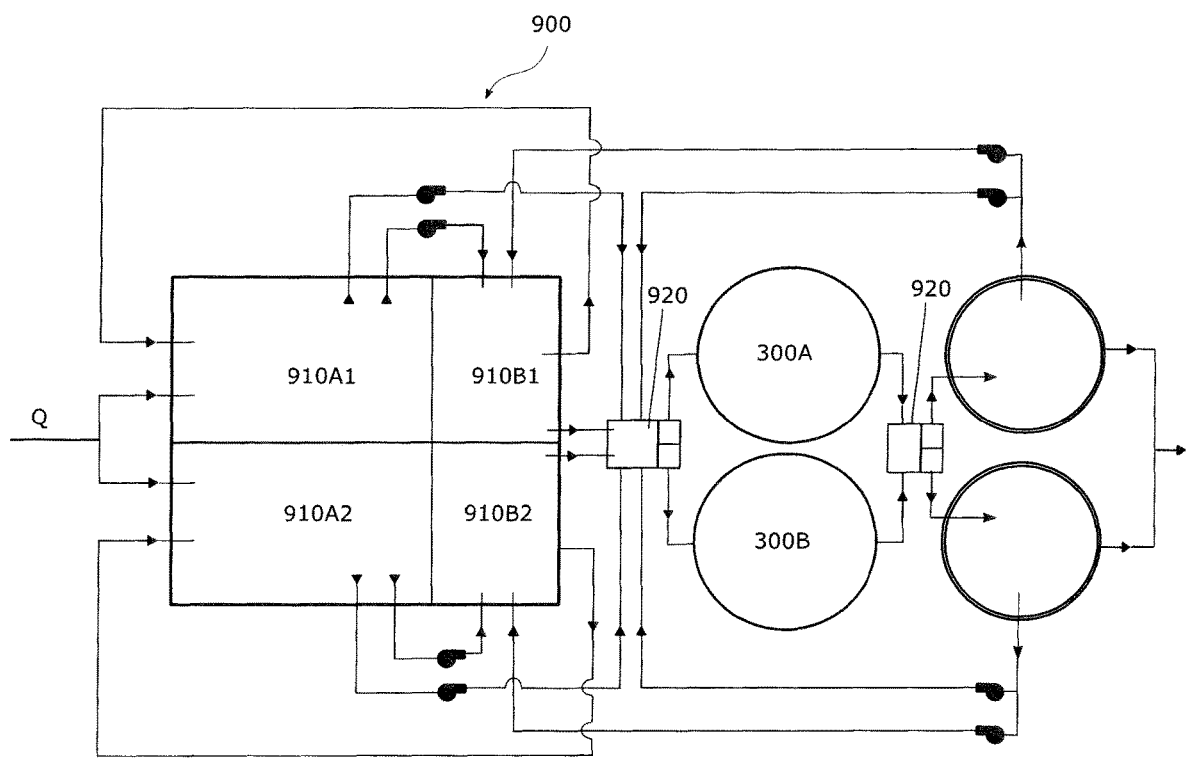
FIG. 9 shows a dual train wastewater treatment system 900 in which an outflow from wastewater treatment zones 910B1 and 910B2 is mixed with a bypass flow from wastewater treatment zones 910A1 and 910A2 in mixing cell 920.

FIG. 9 shows a dual train wastewater treatment system 900 wherein an outflow from wastewater treatment zones 910B1 and 910B2 is mixed with a bypass flow from wastewater treatment zones 910A1 and 910A2 in mixing cell 920.

Figure 10:
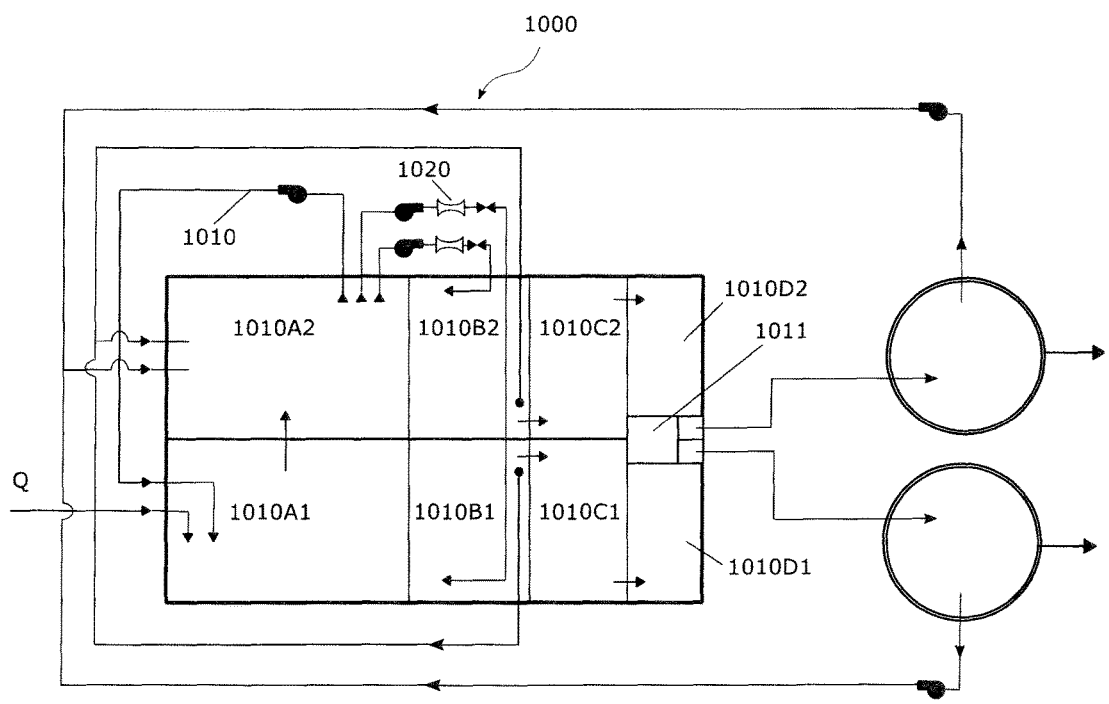
FIG. 10 shows a dual train wastewater system 1000 in which equalization reactor 1010 is divided into two separate process trains 1010A1 and 1010A2.

FIG. 10 shows a dual train wastewater system 1000 in which an equalization reactor basin is divided into two separate process trains 1010A1 and 1010A2. Thus, two EQ reactors are provided in a dual train system at the head of the dual train. In the depicted embodiment, a five stage biological nutrient removal process is provided, wherein the EQ reactor basin is designed to run EQ reactor treatment zone 1010A1 as a first stage anaerobic bio-P equalization reactor in series with EQ reactor treatment zone 1010A2 operated as a second stage anoxic denitrification reactor. Both treatment zones 1010A1 and 1010A2 provide flow equalization. Thereby the dual train system 1000 provides a five stage rather than a four stage biological treatment system to achieve both luxury P removal and biological nitrogen removal.

In particular, in the embodiment of FIG. 10 an inflow of wastewater Q is received in treatment zone 1010A1 to undergo anaerobic bio-P removal. Subsequently, partially treated wastewater flows into the second treatment zone 1010A2, which is an anoxic denitrification treatment zone. Accordingly, the first treatment zones of the two process trains are connected in series. Further, an anoxic recycle flow 1010 is provided from the anoxic denitrification treatment zone 1010A2 to the anaerobic bio-P removal treatment zone 1010A1 with a total flow of 1Q to 2Q.

From the second treatment zone 1010A2, an outflow is pumped into the third stage wastewater treatment reactors 1010B1 and 1010B2. The flow rate is measured with flow meter 1020. The third stage wastewater treatment reactors 1010B1 and 1010B2 are operated as constant volume nitrification reactors. A nitrate recycle flow is provided from treatment reactors 1010B1 and 1010B2 to the anoxic denitrification treatment zone 1010A2 with a flow of 2Q to 4Q.

Additionally, wastewater flows from each of the third wastewater treatment reactors 1010B1 and 1010B2 into the fourth stage wastewater treatment reactors 1010C1 and 1010C2, respectively. Thus, downstream of the equalization reactors 1010A1 and 1010A2 the treatment proceeds in parallel within the two process trains.

An overflow from the fourth wastewater treatment reactors 1010C1 and 1010C2 is discharged to the fifth stage reactors 1010D1 and 1010D2, respectively, which are operated for aerobic treatment. Subsequently, an overflow from the fifth stage reactors 1010D1 and 1010D2 is discharged into a flow splitter 1011 and then is conducted to final clarifiers. A return activated sludge line recycles activated sludge from the final clarifiers to the anoxic denitrification treatment zone 1010A2.

Figure 11:
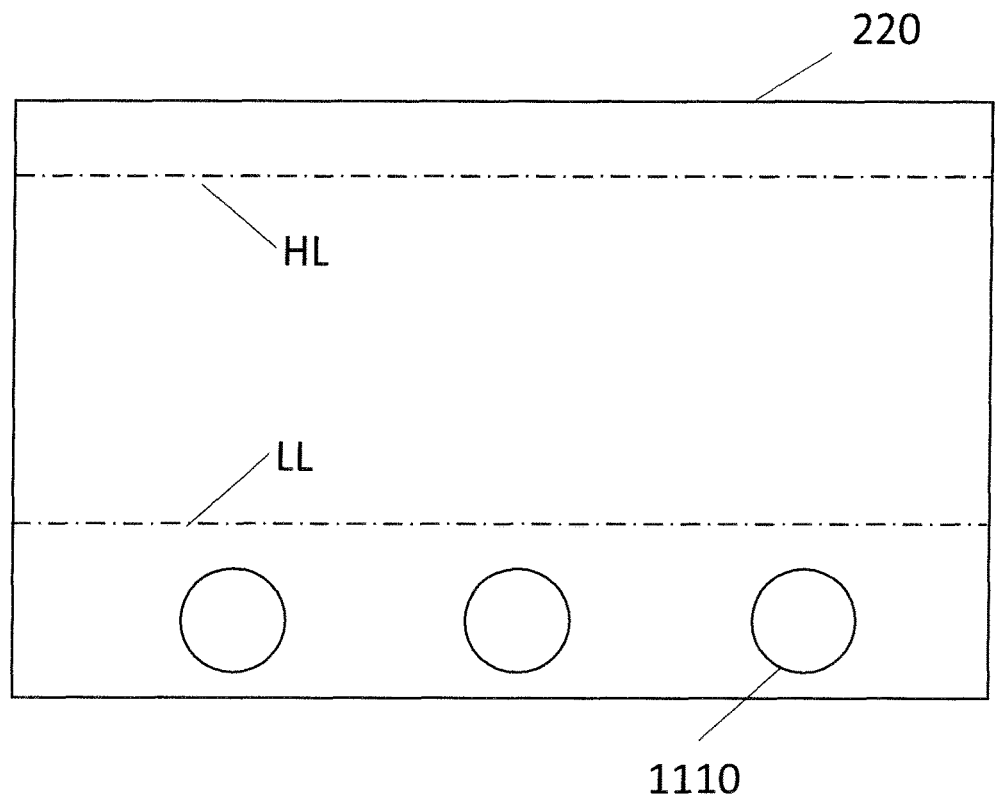
FIG. 11 shows partition wall 220 containing flow holes 1110 provided near the wall bottom; and, FIG. 12 shows dividing curtain 1200, which also contains flow holes towards the bottom.

FIG. 11 shows a partition wall 220 having flow holes 1110 provided near the wall bottom, which allow wastewater to flow from its current treatment zone into the next treatment zone by gravity flow while providing the requisite retention time for wastewater in its current zone. In addition, FIG. 11 shows the low level mark LL and the high level mark HL showing the minimum level and the maximum level of the wastewater, respectively, in an EQ reactor.

Figure 12:
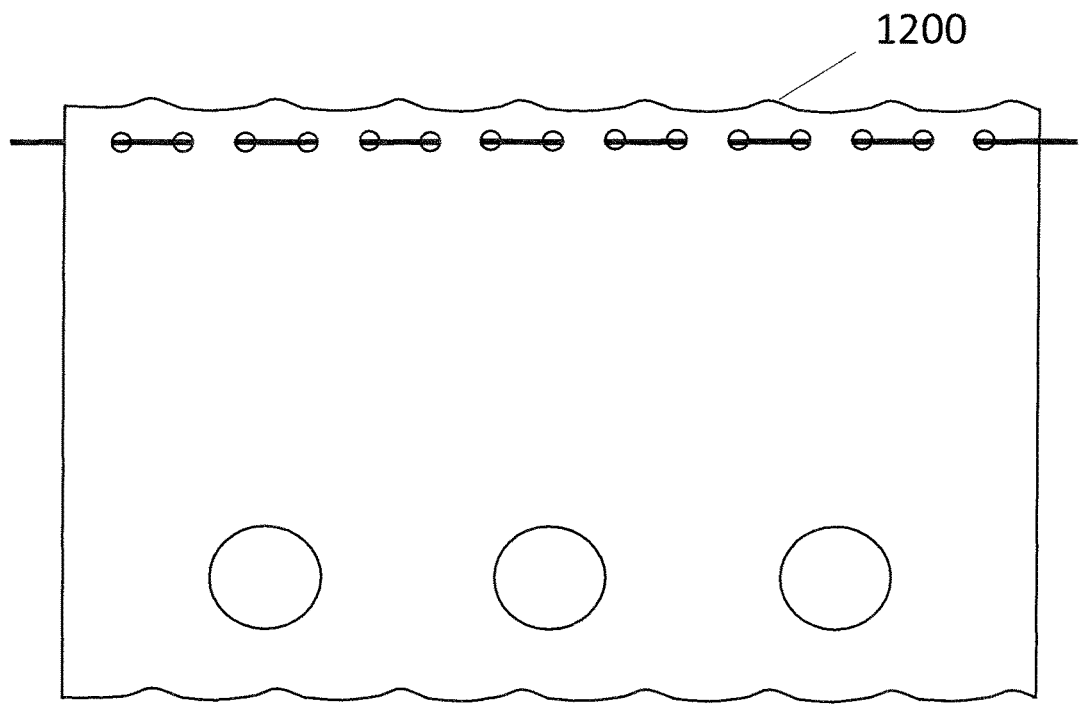

FIG. 12 shows a dividing curtain 1200, which also contains flow holes towards the bottom and which may be used as an alternative to a partition wall.

In all of the above-described exemplary embodiments, at least one wastewater treatment zone of the EQ reactor basin is used as a biological reactor. Thus, the EQ reactor may be a single basin with no sections or zones or a single basin with multiple biological reactor sections. The treatment zones or sections of the EQ reactor basin that are designed and used as biological reactors maintain a variable mixed liquor suspended solids concentration and biomass weight as required to achieve continuous biological luxury uptake for phosphorus removal; or, biological denitrification for nitrite and/or nitrate removal; or, carbonaceous BOD removal; or, biological nitrification for ammonia nitrogen removal.

In addition, the EQ Reactor basin may also include a zone or section that is not a biological reactor but that contains variable volume storage and mixing; or storage, mixing and aeration of screened raw wastewater, primary clarifier effluent wastewater, pretreated DAF cell effluent, or anaerobic lagoon or reactor effluent wastewater. Such a wastewater equalization section or zone of the EQ reactor basin functions to provide variable volume hydraulic flow equalization only, and does not provide biological treatment by an anaerobic, anoxic or aerobic reactor process. Equalized wastewater flow is pumped out of or flows out by gravity from this wastewater equalization section or zone. Multiple pipes, pumps, and/or multiple rate of flow controllers are provided to conduct the effluent to multiple and different downstream treatment processes.

If the EQ reactor treatment zones provide capability for receiving recycle flow such as RAS recycle flow or anoxic recycle flow or nitrite/nitrate mixed liquor recycle flow; and, use process equipment that provides the capability for operation with independent aeration and mixing; or, mixing without aeration, then the EQ reactor zones can be independently controlled to function with great process flexibility. This flexibility includes, but is not limited to aerated or unaerated wastewater equalization; carbonaceous BOD removal; luxury biological phosphorus removal; nitrite and/or nitrate removal, and ammonia removal. Moreover, this flexibility allows the EQ reactor to be optionally operated, for example, in an emergency as a constant depth, maximum volume, or, variable depth, variable volume aerobic reactor for BOD and ammonia nitrogen removal if the downstream constant volume nitrification reactor must be taken out of service. Additional flexibility is provided, if process equipment with independent mixing and aeration capability is used to operate the sections or zones of the EQ reactor in an aerated, aerobic condition at high or higher liquid levels and volumes, and, in an unaerated, anoxic condition at low or lower liquid levels and volumes. For example, if the EQ Reactor is divided into two sections, the first section may be operated as an anoxic denitrification reactor and the second section as an aerobic nitrification reactor when the EQ Reactor is at high or higher liquid levels; while both sections of the EQ Reactor may be operated as an anoxic denitrification reactor at low or lower liquid levels.

Thus, in a typical embodiment, a first biological treatment process is performed in a particular treatment zone and then the process is switched over to a second biological treatment process when desired or necessitated by changes in treatment zone mixed liquor suspended solids concentration and/or biomass weight, wastewater composition, temperature, or flow rate of inflow Q without losing the ability to equalize the wastewater inflow Q. At a later time, the second biological treatment process may be switched back to the first process or to another treatment process.

However, it is also possible to switch between a biological wastewater treatment process and a non-biological wastewater treatment process, such as variable volume wastewater storage, wastewater mixing, or aeration, in one of the treatment zones of an EQ reactor.

Typical combinations of the EQ reactor design are provided in Table 1 below:

TABLE 1

| Comb. | Wastewater EQ Zone | Anaerobic BioP Zone | Anoxic Denite Zone | Aerobic Nitrification Zone | Downstream Nitrification Reactor | Downstream Nitritation Reactor |
|---|---|---|---|---|---|---|
| #1 | | | X | | X | |
| #2 | | | X | X | X | |
| #3 | | X | X | | X | |
| #4 | | X | X | X | X | |
| #5 | X | | X | | | X |
| #6 | | | X | | | X |

In combination #1, an anoxic denitrification treatment zone in an EQ reactor is followed by a downstream nitrification reactor. In combination #2, an aerobic nitrification treatment zone is additionally provided within the EQ reactor.

In combination #3, the EQ reactor includes an anaerobic biological phosphorous removal zone and an anoxic denitrification zone. Additionally, a downstream nitrification reactor is provided. Combination #4 has, additionally, an aerobic nitrification zone within the EQ reactor.

Combination #6 includes an anoxic denitrification EQ reactor zone followed by a downstream constant volume nitritation reactor with gravity nitrite recycle flow back into the anoxic EQ reactor zone. Combination #5 additionally includes a wastewater equalization zone upstream of the biological treatment zones.

The EQ reactor design and operation is therefore very flexible depending upon the downstream biological reactor process required and the total variable hydraulic flow equalization volume required. All the reactor sections or zones of the EQ reactor have approximately equal variable liquid depth ranging between the low liquid level minimum residual volume and the high liquid level maximum storage volume. The partition wall(s) 220 or curtains 1200 in the EQ reactor segregate the basin into separate process zones that operate at substantially similar variable liquid depth between low and high liquid levels. The partition walls therefore have only openings in the partition at or near the bottom of the basin to allow wastewater to flow by gravity head from the first, to the second, to the third sections as required. The locations of the partition walls or curtains in the EQ reactor basin are selected or designed to provide the desired or required treatment process volume in each section between the low liquid level and the high liquid level.

In a typical municipal wastewater treatment system, the biological treatment process has at least two process trains in order to provide system redundancy and reliability. By providing an EQ reactor for each process train, great flexibility is achieved in the treatment system. Thus, in a particular embodiment, at least two EQ reactors are provided with a dual train or multi-train wastewater treatment system. If two EQ reactors are provided in a dual train system upstream of an existing dual train, four stage biological nitrogen removal system, then the EQ reactor can be designed to optionally run in series with EQ reactor #1 operated as first stage anaerobic bio-P equalization reactor #1 and with EQ reactor #2 operated as second stage anoxic denitrification reactor #2. Thereby, the dual train is used to provide five stage rather than a four stage biological treatment system to achieve both luxury P removal and biological nitrogen removal.

The embodiments described hereinabove are further intended to explain best modes known of practicing it and to enable others skilled in the art to utilize the disclosure in such, or other, embodiments and with the various modifications required by the particular applications or uses. Accordingly, the description is not intended to limit it to the form disclosed herein. Also, it is intended that the appended claims be construed to include alternative embodiments.

The foregoing description of the disclosure illustrates and describes the present disclosure. Additionally, the disclosure shows and describes only the preferred embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purpose, as if each individual publication, patent or patent application were specifically and individually indicated to be incorporated by reference. In the case of inconsistencies, the present disclosure will prevail.

What is claimed is:

1. A method of treating wastewater in a dual train or multi-train biological wastewater treatment system comprising:
   providing at least two flow equalization reactors upstream of a dual train or multi-train wastewater treatment system comprising more than one wastewater treatment zone; and,
   operating the at least two flow equalization reactors in series,
   wherein the at least two flow equalization reactors comprise at least one biological reactor.

2. The method according to claim 1, wherein the biological wastewater treatment is selected from the group consisting of carbonaceous biological oxygen demand (BOD) removal, luxury biological phosphorous uptake, nitrite removal, nitrate removal, nitrite and nitrate removal, and ammonium nitrogen removal.

3. The method according to claim 1, further comprising an inflow Q of wastewater flowing into the at least two flow equalization reactors, wherein the inflow Q of wastewater is screened raw wastewater, screened stormwater, a mixture of screened raw wastewater and screened stormwater, a primary clarifier effluent, a dissolved air flotation (DAF) pre-treatment system effluent, an anaerobic lagoon effluent, or an anaerobic reactor effluent.

4. The method according to claim 1, wherein an outflow from the more than one wastewater treatment zone has a substantially constant pumping rate or feed forward flow rate.

5. The method according to claim 1, wherein a downstream wastewater treatment stage is selected from one or more of a downstream nitrification stage, a downstream nitritation stage, an anammox reactor stage, and a final clarifier stage.

6. The method according to claim 5, further comprising:
   providing a nitrate and/or nitrite mixed liquor recycle flow (NITR) line from the downstream wastewater treatment stage to an upstream wastewater treatment stage.

7. The method according to claim 6, wherein a nitrite and/or nitrate mixed liquor recycle flow through the (NITR) line is of from 100% to 400% of the inflow Q into the flow equalization reactor.

8. The method according to claim 1, further comprising:
   providing a return activated sludge line from a downstream wastewater treatment stage to an upstream wastewater treatment stage.

9. The method according to claim 1, further comprising:
   providing an anoxic mixed liquor recycle flow of from 50% to 200% of an inflow Q from a downstream wastewater treatment zone to an upstream wastewater treatment zone.

10. The method of claim 1, wherein all trains of the dual train or multi-train wastewater treatment system provide flow equalization.

11. A method of treating wastewater in a dual train or multi-train biological wastewater treatment system comprising:
    providing at least two flow equalization reactors upstream of a dual train or multi-train wastewater treatment system comprising more than one wastewater treatment zone;
    operating the at least two flow equalization reactors in series;
    operating a first flow equalization zone or reactor as a first stage anaerobic reactor for biological phosphorous removal;

conducting an outflow from the first flow equalization zone or reactor to a second flow equalization zone or reactor;

operating the second flow equalization zone or reactor as an anoxic denitrification zone or reactor for biological nitrogen removal; and, operating a third flow equalization zone or reactor as an aerobic nitrification reactor for biological ammonia nitrogen removal, wherein the at least two flow equalization reactors comprise at least one biological reactor.

12. The method of claim 11, further comprising operating a fourth flow equalization zone or reactor and/or a fifth flow equalization zone or reactor for further aerobic treatment.

13. The method of claim 12, wherein wastewater discharge from the fourth or fifth flow equalization zone is discharged into a flow splitter that is conducted to one or more clarifiers.

14. The method of claim 13, wherein a return activated sludge line recycles activated sludge from the one or more clarifiers to the anoxic denitrification treatment zone.

15. The method of claim 11, wherein the third flow equalization zone is operated as a constant volume nitrification reactor.

16. A method of treating wastewater in a dual train or multi-train biological wastewater treatment system comprising:
providing at least two flow equalization reactors upstream of a dual train or multi-train wastewater treatment system comprising more than one wastewater treatment zone;
operating the at least two flow equalization reactors in series; and
providing a return activated sludge line from a downstream wastewater treatment stage to an upstream wastewater treatment stage,
wherein the at least two flow equalization reactors comprise at least one biological reactor, and
wherein a return activated sludge flow through the return activated sludge line is of from 50% to 200% of the inflow of wastewater into the flow equalization reactor.

17. A method of treating wastewater in a dual train or multi-train biological wastewater treatment system comprising:
providing at least two flow equalization reactors upstream of a dual train or multi-train wastewater treatment system comprising more than one wastewater treatment zone;
operating the at least two flow equalization reactors in series;
operating a first flow equalization zone or reactor as a first stage anaerobic reactor for biological phosphorous removal;
conducting an outflow from the first flow equalization zone or reactor to a second flow equalization zone or reactor;
operating the second flow equalization zone or reactor as an anoxic denitrification reactor for biological nitrogen removal;

operating a third flow equalization zone or reactor as an aerobic nitrification reactor for biological ammonia nitrogen removal;

providing a nitrite mixed liquor recycle flow from a nitritation reactor into a first wastewater treatment zone of one of the flow equalization reactors;

obtaining a total outflow out of the flow equalization reactor, the total outflow having a volume corresponding to a total volume of an inflow Q and the nitrite mixed liquor recycle flow;

conducting about 55% of a total inflow from the flow equalization reactor into a nitritation reactor as a flow $Q_1$;

receiving about 45% of a total inflow from the flow equalization reactor as a flow $Q_2$; and, mixing the flow $Q_1$ and the flow $Q_2$, wherein the at least two flow equalization reactors comprise at least one biological reactor.

18. The method according to claim 17, further comprising:
receiving the mixture of the flow $Q_1$ and the flow $Q_2$ in an anammox reactor.

19. The method according to claim 18, further comprising:
receiving an outflow from the anammox reactor in a final clarifier.

20. The method according to claim 19, further comprising:
providing a first return activated sludge flow from the final clarifier in the nitritation reactor; and,
providing a second return activated sludge flow from the final clarifier to the anammox reactor.

21. The method according to claim 20, wherein the first activated sludge flow is of from 0% to 20% of an inflow of wastewater into the flow equalization reactor, and
wherein the second activated sludge flow is of from 80% to 200% of the inflow of wastewater into the flow equalization reactor.

22. A method of treating wastewater in a dual train or multi-train biological wastewater treatment system comprising:
providing at least two flow equalization reactors upstream of a dual train or multi-train wastewater treatment system comprising more than one wastewater treatment zone;
operating the at least two flow equalization reactors in series;
operating at least one of the at least two flow equalization reactors as a first stage anaerobic reactor for biological phosphorous removal; and
operating at least one of the at least two flow equalization reactors as an anoxic denitrification reactor for biological nitrogen removal;
wherein the at least two flow equalization reactors comprise at least one biological reactor.

\* \* \* \* \*